United States Patent
Lin et al.

(10) Patent No.: US 7,583,499 B2
(45) Date of Patent: Sep. 1, 2009

(54) HOLDER FOR ELECTRONIC APPARATUS

(75) Inventors: Chia-Yi Lin, Hualien County (TW); Shih-Feng Lo, Taipei Hsien (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 195 days.

(21) Appl. No.: 11/768,200

(22) Filed: Jun. 26, 2007

(65) Prior Publication Data

US 2008/0242376 A1   Oct. 2, 2008

(30) Foreign Application Priority Data

Apr. 2, 2007   (TW) .............................. 96205336 U

(51) Int. Cl.
*G06F 1/16* (2006.01)

(52) U.S. Cl. ........................... 361/679.58; 361/679.43; 361/679.57

(58) Field of Classification Search ................. 361/686, 361/679.58
See application file for complete search history.

(56) References Cited

U.S. PATENT DOCUMENTS

| | | | |
|---|---|---|---|
| 5,627,727 A * | 5/1997 | Aguilera et al. ............. | 361/686 |
| 5,708,707 A * | 1/1998 | Halttunen et al. ............ | 379/446 |
| 6,002,921 A * | 12/1999 | Pfahlert et al. ............ | 455/575.9 |
| 6,192,722 B1 * | 2/2001 | Galant ........................... | 70/58 |
| 6,341,218 B1 * | 1/2002 | Poplawsky et al. ........ | 455/569.1 |
| 6,438,229 B1 * | 8/2002 | Overy et al. ................. | 379/446 |
| 6,477,391 B1 * | 11/2002 | Muramatsu et al. ...... | 455/550.1 |
| 6,490,155 B2 * | 12/2002 | Han et al. .................... | 361/686 |
| 6,762,585 B2 * | 7/2004 | Liao ............................ | 320/107 |
| 6,816,713 B2 * | 11/2004 | Chen ......................... | 455/90.3 |
| 6,848,662 B2 * | 2/2005 | Paramonoff et al. ..... | 248/309.1 |
| 7,173,818 B2 * | 2/2007 | Hou et al. .................... | 361/686 |
| 2002/0024794 A1 * | 2/2002 | Lin et al. ..................... | 361/686 |
| 2008/0055844 A1 * | 3/2008 | Kobayashi et al. .......... | 361/686 |

* cited by examiner

*Primary Examiner*—Jayprakash N Gandhi
*Assistant Examiner*—Anthony Q Edwards
(74) *Attorney, Agent, or Firm*—Winston Hsu

(57) ABSTRACT

The invention provides a holder having a main body, a fixing module and an actuating module. Both the fixing module and the actuating module are positioned on the main body. When the actuating module moves along a first direction, the fixing module is driven from either a release state or a fixed state to another state along a second direction different from the first direction. The invention further provides a holder applied to an electronic apparatus. The holder has a main body and a detachable base. The detachable base is positioned on the main body, and has a base cover and a circuit board. The base cover has a connecting part. The circuit board is covered by the base cover, and has a plurality of pins for connecting to a connecting port of the electronic apparatus.

18 Claims, 3 Drawing Sheets

HOLDER FOR ELECTRONIC APPARATUS

BACKGROUND OF THE INVENTION

1. Field of the Invention

The present invention relates to a holder, and more particularly, to a holder having a fixing module and an actuating module, where the moving direction of the fixing module is different from that of the actuating module; for example, the moving directions of the fixing module and the actuating module are perpendicular to each other.

2. Description of the Prior Art

In recent years, owing to the rapid development of mobile computing, all kinds of hand-held multimedia products and entertainment equipment have become popular; wherein, the combination of electronic products and vehicles is maturing, and global positioning system (GPS) navigation apparatus are considered essential electronic products for vehicles. When using the global positioning system navigation equipment in an automobile, there is a need for a holder to fix the navigation equipment somewhere in the automobile in order to help the driver operate the global positioning system navigation equipment while on the move. In the present market, the holder for a vehicle navigation system may be divided into two types: simple and complicated. The simple types mostly use tabs to fix the navigation equipment along the vertical direction, while the complicated types use additional button structures to fix or release the global positioning system navigation equipment along the vertical direction. However, the traditional fixing means are unable to ensure a sturdy hold on the navigation equipment. For example, when a violent shock occurs suddenly, it is extremely easy for the global positioning system navigation equipment to become detached from the holder and distract the attention of the automobile driver, thereby affecting traffic safety and potentially causing damage to the navigation equipment. In addition, the complicated type of holder structure is mainly designed for a specific navigation equipment model; other models are unable to use the same holder.

SUMMARY OF THE INVENTION

It is therefore one of the objectives of the present invention to provide a holder to solve the above problem. According to an exemplary embodiment of the present invention, the holder comprises: a main body; a fixing module, positioned on the main body; and an actuating module, positioned on the main body, wherein when the actuating module moves along a first direction, the fixing module is driven from a release state or a fixed state to the other state along a second direction which is different from the first direction.

In addition, according to another exemplary embodiment of the present invention, a holder applied to an electronic apparatus is also disclosed. The holder comprises a main body and a detachable base. The detachable base is positioned on the main body and has a base cover and a circuit board. The base cover has a connecting part on a housing thereof, the shape of the connecting part matching the shape of a connecting port of the electronic apparatus, and the connecting part having a plurality of holes. The circuit board is covered by the base cover and has a plurality of pins sticking out of the plurality of holes for connecting the connecting port of the electronic apparatus when the electronic apparatus is positioned on the detachable base.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
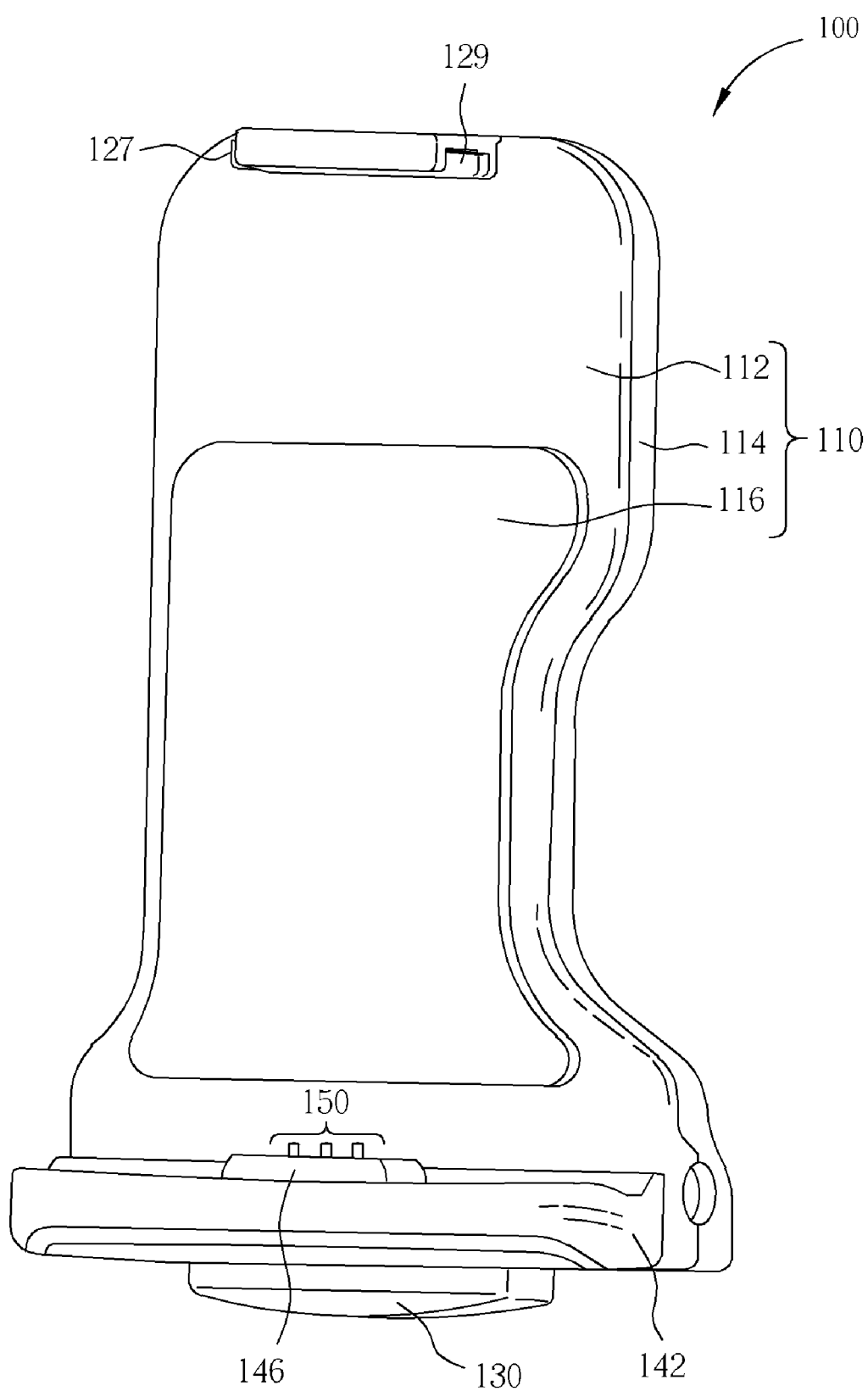
FIG. 1 is a perspective diagram illustrating a holder according to an embodiment of the present invention.
Figure 2:
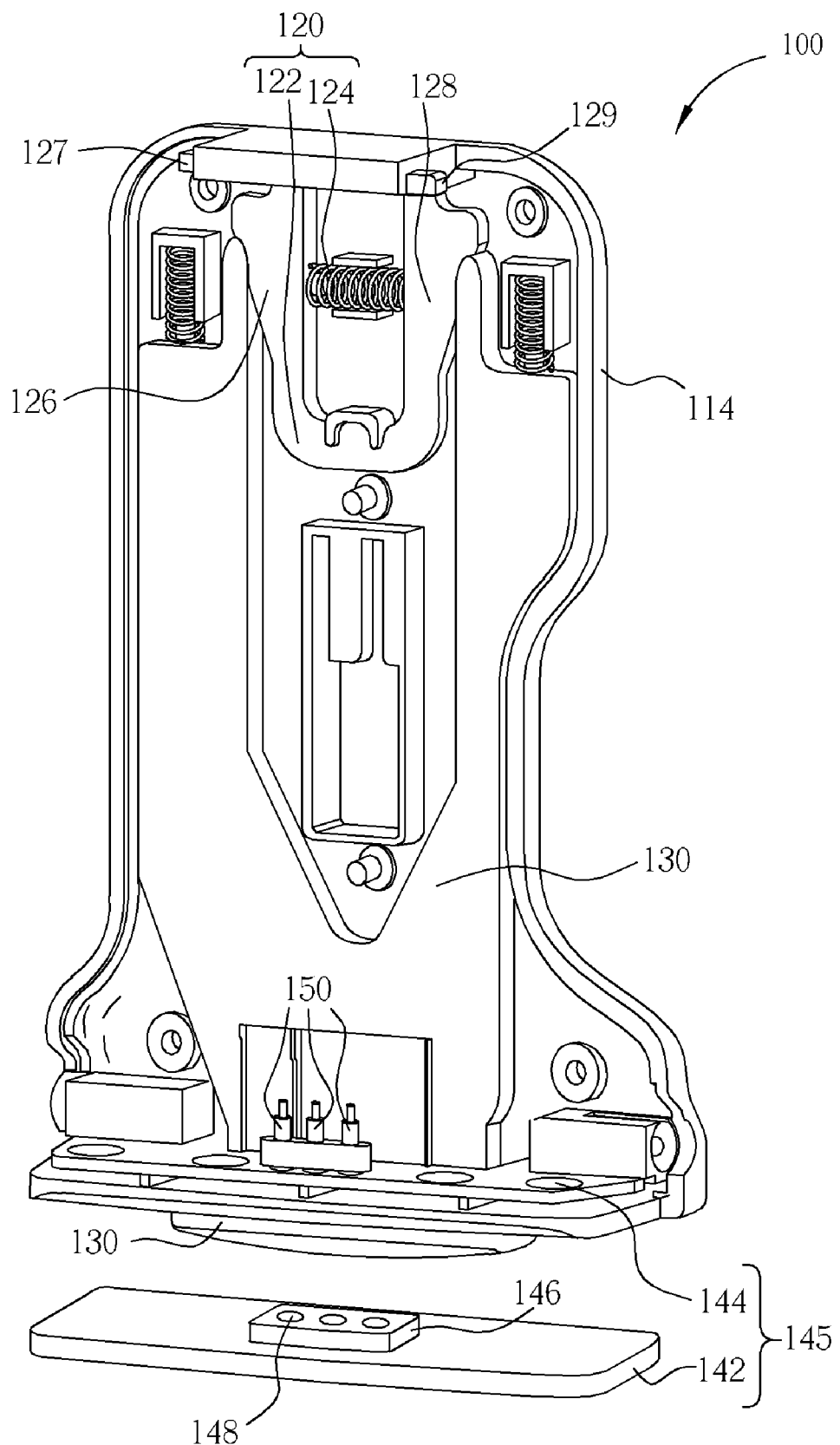
FIG. 2 is an inner structure diagram illustrating the holder shown in FIG. 1.

Please refer to FIG. 1 and FIG. 2 together. FIG. 1 and FIG. 2 are a perspective diagram and an inner structure diagram respectively, both illustrating a holder 100 according to an embodiment of the present invention. As shown in FIG. 1 and FIG. 2, the holder 100 has a main body 110, a fixing module 120 and an actuating module 130. The fixing module 120 is positioned on the main body 110, and the actuating module 130 is positioned on the main body 110 as well. When the actuating module 130 moves along a first direction, the fixing module 120 is driven from either a release state or a fixed state to the other state along a second direction which is different from the first direction. In this embodiment, the first direction is a vertical direction and the second direction is a horizontal direction; this example is for illustrative purposes only, however, and is not meant to be a limitation of the present invention. The detailed structure and the operation of the holder 100 are as follows.

Please note that the holder disclosed in the present invention is a holder applied to an electronic apparatus (e.g. a holder designed for a vehicle); more specifically, the electronic apparatus is a portable electronic apparatus. For example, the holder 100 in this embodiment is a holder designed for fixing a global positioning system (GPS) navigation apparatus somewhere in the vehicle. The holder 100 of the present invention can be applied to any objects, to which an electronic apparatus should be fixed, however; in other words, the above-mentioned example is merely for illustrative purposes, and is not meant to be a limitation of the present invention. For example, the holder disclosed in the present invention could be a holder applied to a mobile phone.

Figure 3:
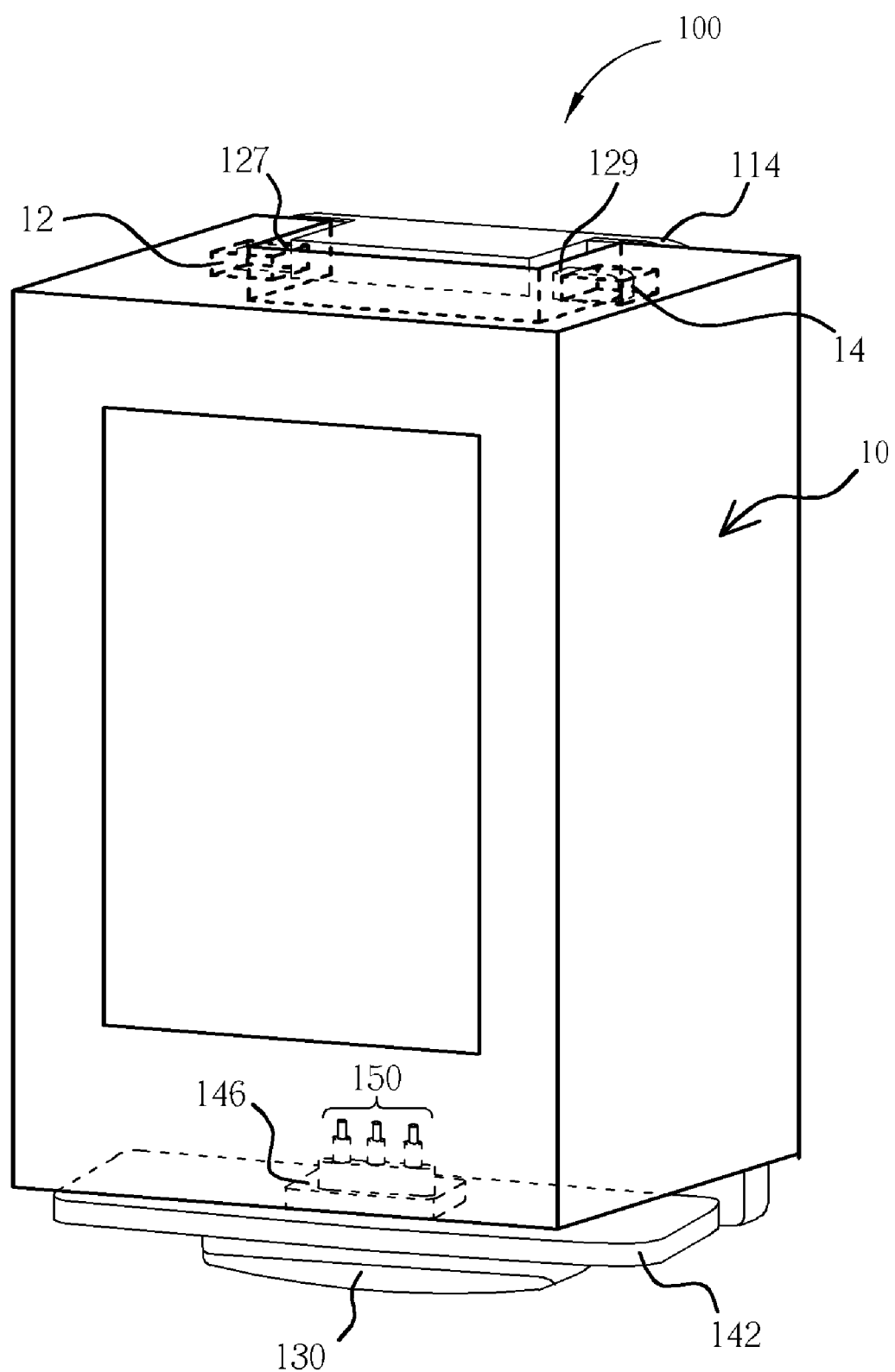
FIG. 3 is a diagram illustrating an electronic apparatus fixed onto a holder of the present invention.

Please refer to FIG. 1 and FIG. 2 again. The main body 110 includes a front cover 112, a back cover 114, and has a sponge pad 116 positioned on the front cover 112; therefore, when an electronic apparatus, such as a GPS navigation apparatus, is fixed on the holder 100, the sponge pad 116 can absorb an external shock in order to prevent the electronic apparatus from impacting against the front cover 112. The fixing module 120 has a latch component 122 having a first hook part 126 and a second hook part 128. The first hook part 126 and the second hook part 128 respectively have a first tab 127 and a second tab 129 thereon. The fixing module 120 is made of a flexible material, so the latch component 122 can be in a fixed state to fix the electronic apparatus by the first tab 127 and the second tab 129 without being subjected to an external force, and the latch component 122 can be in a release state to allow the electronic apparatus to be installed in or released from the holder 100 when subjected to an external force. As shown in FIG. 2, while the actuating module 130 moves down (i.e. along a vertical direction), the deformation of the latch component 122 is induced due to an external force exerted thereto and the first tab 127 and the second tab 129 are driven to stretch out (i.e. along a horizontal direction) so as to place the fixing module 120 into a fixed state. In other words, when the first tab 127 and the second tab 129 "stretch out" (i.e. push apart along the horizontal direction), the electronic apparatus can be fixed onto the holder 100. Please refer to FIG. 3. FIG. 3 is a diagram illustrating an electronic apparatus 10 fixed onto the holder 100 of the present invention. As shown in FIG. 3, the electronic apparatus 10 has a first hole 12 and a second hole 14. The first hole 12 and the second hole 14 are disposed in the back of the electronic apparatus 10 and respectively correspond to the first tab 127 and the second tab 129. While the holder 100 is in the above-mentioned fixed state, the first tab 127 and the second tab 129 enter the first hole 12 and the second hole 14 respectively to provide the electronic apparatus 10 with an outward force in order to fix the electronic apparatus 10 onto the holder 100. Likewise, while the actuating module 130 moves up (i.e. along the vertical direction)—for example, a user pushes the actuating module 130 in a direction from the base to the top—an external force exerted upon the first tab 127 and the second tab 129 induces the deformation of the latch component 122, and first tab 127 and the second tab 129 retract (i.e. along the horizontal direction) so as to place the fixing module 120 in the release state. That is, when the first tab 127 and the second tab 129 are driven to retract (i.e. along the horizontal direction), the holder 100 no longer secures the electronic apparatus 10. In other words, the electronic apparatus 10 is released from the holder 100.

In addition, in order to increase the fixing stability of the holder 100, the fixing module 120 further has an elastic component 124 that is separately connected to the first hook part 126 and the second hook part 128 at its two ends. While the deformation of the latch component 122 is induced due to an external force exerted thereto and the first tab 127 and the second tab 129 are driven to stretch out, the elastic component 124 provides further elastic force to the latch component 122 to fix the electrical apparatus onto the holder 100 more steadily. In this embodiment, the elastic component 124 is implemented by a spring; however, this is not meant to be a limitation of the present invention. The latch component 122 is made of a flexible material so it can provide sufficient elastic force while being subjected to an external force causing the deformation. The elastic component 124, therefore, is an optional component in the present invention, depending upon design requirements. For example, in other embodiments, the fixing module 120 may only have a single hook part and a single tab and may forgo such an elastic component.

Furthermore, as illustrated in FIG. 1 and FIG. 2, a detachable base 145 is positioned on the main body 110 of the holder 100, and comprises a base cover 142 and a circuit board 144. There is a connecting part 146 on the housing of the base cover 142. The connecting part 146 has a plurality of holes 148. In addition, the base cover 142 covers the circuit board 144. The circuit board 144 has a plurality of pins 150 protruding from the plurality of holes 148 of the connecting part 146 for connecting to the connecting port of the electronic apparatus when the electronic apparatus is positioned on the detachable base 145. For example, the connecting port of the electronic apparatus has an external power source connecting the holes, and the circuit board 144 has a charger circuit, so the electronic apparatus can be charged via the pins 150. Please note that the pins 150 also can be used to transmit other kinds of electrical signals depending on design requirements, and the circuit board 144 can also comprise other related processing circuits.

Compared with the prior art, the utilization of the holder of the present invention to fix the electronic apparatus along the horizontal direction considerably increases the stability and safety of the electronic apparatus while in use. In addition, as the base portion of the holder adopts a modularized design (i.e. the detachable base), the holder of the present invention can be adapted to different types of electronic apparatus simply by properly changing the design of the base cover and/or the circuit board in the detachable base. In this way, the production cost can be increased decreased. In other words, the holder of the present invention can avoid the drawbacks of the prior art where stability and safety are poor when the electronic apparatus is fixed along the vertical direction, and the complicated type of holder cannot be applied to other models of electronic apparatus.

Those skilled in the art will readily observe that numerous modifications and alterations of the device and method may be made while retaining the teachings of the invention.

What is claimed is:

1. A holder, comprising:
   a main body;
   a fixing module positioned on the main body, the fixing module comprising:
      a latch component made of a flexible material, the latch component comprising:
         a first hook part having a first tab thereon; and
         a second hook part having a second tab thereon; and
      an elastic component, having a first end and a second end connected to the first hook part and the second hook part respectively, for exerting an elastic force to the latch component while a deformation of the latch component is induced; and
   an actuating module, positioned on the main body, wherein when the actuating module moves along a first direction, the deformation of the latch component is induced to drive the first tab from either a release state or a fixed state to another state along a second direction different from the first direction and to drive the second tab from either the release state or the fixed state to another state along the second direction.

2. The holder of claim 1, wherein the first direction is substantially perpendicular to the second direction.

3. The holder of claim 2, wherein the first direction is a vertical direction and the second direction is a horizontal direction.

4. The holder of claim 1, being a holder for an electronic apparatus.

5. The holder of claim 4, wherein the electronic apparatus is a portable apparatus.

6. The holder of claim 4, wherein the electronic apparatus is a global positioning system (GPS) navigation apparatus.

7. The holder of claim 4, wherein the electronic apparatus is a mobile phone.

8. The holder of claim 4, wherein the holder further comprises a detachable base positioned on the main body, the detachable base comprising:
   a base cover, having a connecting part on a housing thereof, a shape of the connecting part matching a shape of a connecting port of the electronic apparatus, the connecting part having a plurality of holes; and a circuit board, covered by the base cover, the circuit board having a plurality of pins sticking out of the plurality of holes, for connecting the connecting port of the electronic apparatus when the electronic apparatus is positioned on the detachable base.

9. The holder of claim 1, being a holder for a vehicle.

10. A holder for an electronic apparatus, the holder comprising:
   a main body;
   a fixing module, positioned on the main body;
   an actuating module, positioned on the main body, wherein when the actuating module moves along a first direction, the fixing module is driven from either a release state or a fixing state to another state along a second direction different from the first direction; and
   a detachable base positioned on the main body, the detachable base comprising:
      a base cover, having a connecting part on a housing thereof, a shape of the connecting part matching a shape of a connecting port of the electronic apparatus, the connecting part having a plurality of holes; and
      a circuit board, covered by the base cover, the circuit board having a plurality of pins sticking out of the plurality of holes, for connecting the connecting port of the electronic apparatus when the electronic apparatus is positioned on the detachable base.

11. The holder of claim 10, wherein the first direction is substantially perpendicular to the second direction.

12. The holder of claim 11, wherein the first direction is a vertical direction and the second direction is a horizontal direction.

13. The holder of claim 10, wherein the fixing module comprises:
   a latch component, made of a flexible material, the latch component including a first hook part having a first tab thereon, wherein when the actuating module moves along the first direction, a deformation of the latch component is induced to drive the first tab from either the release state or the fixed state to another state according to the second direction.

14. The holder of claim 13, wherein the latch component further comprises a second hook part having a second tab thereon; when the actuating module moves along the first direction, the deformation of the latch component is induced to drive the second tab from either the release state or the fixed state to another state according to the second direction; and the fixing module further comprises:
   an elastic component, having a first end and a second end connected to the first hook part and the second hook part respectively, for exerting an elastic force to the latch component while the deformation of the latch component is induced.

15. The holder of claim 10, wherein the electronic apparatus is a portable apparatus.

16. The holder of claim 10, wherein the electronic apparatus is a global positioning system (GPS) navigation apparatus.

17. The holder of claim 10, wherein the electronic apparatus is a mobile phone.

18. The holder of claim 10, being a holder for a vehicle.

* * * * *